June 12, 1962

R. F. SNYDER 3,038,984

RETREADING SYSTEM

Filed Oct. 8, 1959

INVENTOR.
ROBERT F. SNYDER
BY
J. B. Holden
ATTORNEY

# United States Patent Office 3,038,984
Patented June 12, 1962

3,038,984
RETREADING SYSTEM
Robert F. Snyder, Lakemore, Ohio, assignor to The Goodyear Tire & Rubber Company, Akron, Ohio, a corporation of Ohio
Filed Oct. 8, 1959, Ser. No. 845,112
5 Claims. (Cl. 219—20)

This invention relates to tire vulcanization equipment and particularly to electrical retreading apparatus for large tires.

A system for vulcanizing retreads to tires by means of dynamically controlled electrical heating elements mounted internally of the tire and coordinated thermodynamically with a steam-heated outer mold is described in detail in copending application Serial No. 725,262 filed March 31, 1958, and entitled "Electrical Temperature Control Apparatus." Such apparatus may be used very satisfactorily to vulcanize retreads on passenger and similar sized tires but was found to possess limitations when used to retread large tires where large amounts of heat and therefore high electrical power levels are required. It has been found that, even though the system described in the copending application is adapted to cyclically heat a series of electrical heating units or elements, due to the relatively large bulk involved in truck and earthmover tires, the individual heating units cool down too rapidly during the "off" time. This is particularly troublesome during the initial stages of vulcanization since the tire is relatively cool compared to the heating element and therefore acts as a large heat sink. This results in a prolonging of the time required to effect cure and also increases the risk of over or under cure of portions of the tire.

Figure 1:
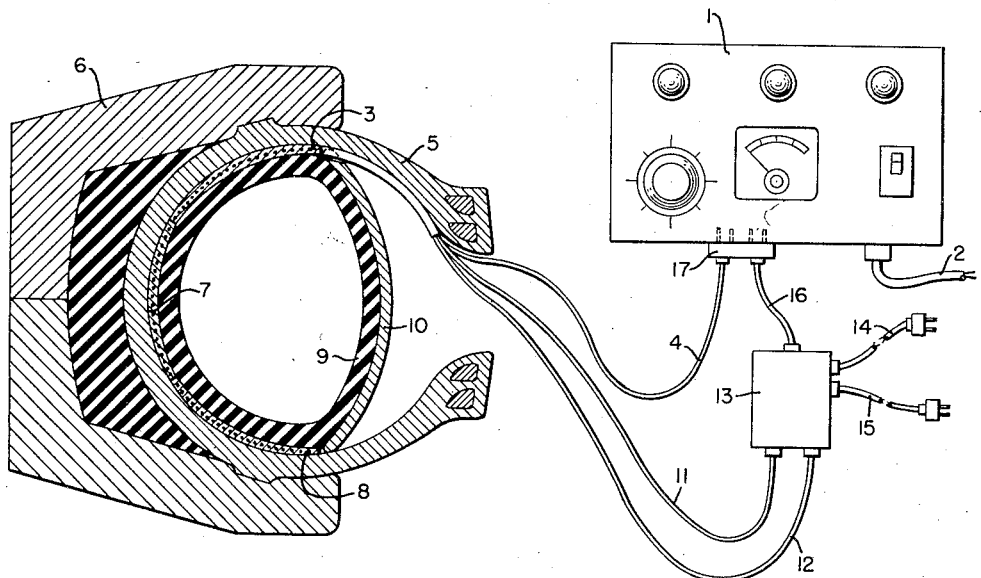
Figure 2:
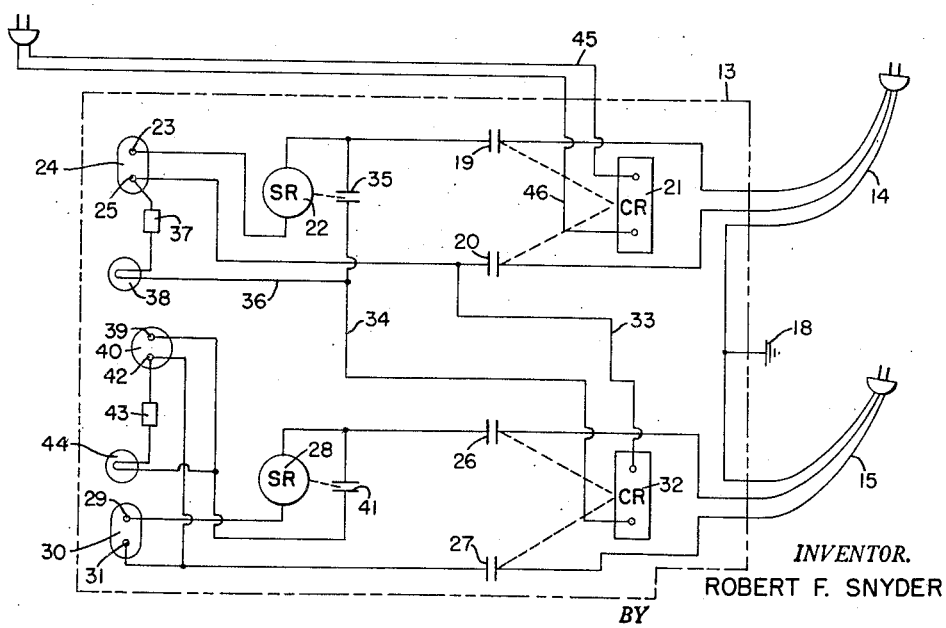

It is an object of the present invention to provide a control apparatus by which means a standard controller, for example the type described in the copending application previously referred to, can easily be adapted for the use of a plurality of heating units or elements for retreading or vulcanizing large tires. It is a further object of the present invention to provide an adapter unit which permits the utilization of a plurality of heating elements without requiring substantial increase in the power handling capacity of the main control unit. It is a still further object of the present invention to provide an adapter unit which permits the use of any number of heating elements in a tire vulcanization system. These and other objects of the present invention will become more apparent from the following description and drawings in which:

FIG. 1 shows a complete vulcanization system according to the present invention; and FIG. 2 represents a schematic wiring diagram of a typical adapter unit made according to the present invention.

As previously mentioned the vulcanization or retreading of large tires presents some unique problems, the principal one being the very rapid cooling down of the tire during that period in which the heating element may be disconnected from its power source. It has been found that it is not practical to merely increase the power level used in the heating element since this increases the risk of damage to the control unit and also necessitates the purchase of an additional special controller on the part of the retreader. By utilizing an adapter made according to the present invention the retreader may continue to use a standard 220 volt truck tire control box and yet provide any number of heating elements for vulcanization of large tires. The present invention also minimizes the "off" time of the elements by providing an instantaneous operation of all elements. Furthermore, the adapter to be described permits the use of a separate power source for each element, thereby avoiding high power levels in the main control box with the resultant increase in safety and decrease in possible damage to the box.

Referring to FIG. 1, a main electrical control unit 1 is supplied power, for example 220 vac., through lead 2 from a conventional commercial power source, not shown. Details of one control circuit which may be used as the main control unit can be found in the copending application previously referred to and therefore details of the main control need not be presented here. Power for one electrical tire heating unit or element 3 is supplied from the control box 1 through cable 4. The band 3 is shown in FIG. 1 located on the interior surface of a large tire 5 enclosed in a conventional steam-heated mold 6. The heating unit 3, along with additional units 7 and 8, is held in position in the tire by a conventional inflatable curing bag 9 backed by a curing rim 10. Heating units 7 and 8 are supplied power through cables 11 and 12 leading from the adapter box 13. Adapter 13 is supplied power, for example 220 vac., through cables 14 and 15 which may be connected to conventional commercial power sources. A control lead 16 is connected between adapter 13 and control box 1. As will later be seen, a simple modification of the receptacle 17 in control box 1 permits the use of the adapter or a series of adapters such as will be described in order to facilitate the utilization of a plurality of heating units. It will be obvious, of course, that while the heating units or elements are referred to as single electrical resistance heaters, each could comprise a plurality of smaller individual resistance heaters. The principal limitations which might determine the number of heaters which may be connected to an individual power source are the total power available and the amount of heat required to maintain tire at vulcanization temperature.

The electrical circuit of a typical adapter according to the present invention is illustrated in FIG. 2. Cables 14 and 15 supply power to the adapter 13 from conventional commercial power sources, not shown. Each of the cables has a ground lead terminating at any convenient point, such as 18. The other two leads of cable 14 contain normally open contacts 19 and 20 which are controlled by control relay 21. The lead from normally open contacts 19 connects to switching relay 22 which is capable of withstanding high powers and thence to terminal 23 of outlet plug 24 to which may be connected a cable such as cable 11 illustrated in FIG. 1. The lead from normally open contacts 20 connects directly to terminal 25 at outlet plug 24. The ungrounded leads of cable 15 likewise connect to normally open contacts 26 and 27. In the manner previously described, a lead runs from contacts 26 through a relay 28 and to terminal 29 in outlet plug 30. Similarly the lead from contacts 27 passes directly to terminal 31 in outlet plug 30. A control relay 32 similar to relay 21 is connected across the power leads of cable 14 by means of a lead 33 connected to the cold side of normally open contacts 20 and a lead 34 which contains a set of normally open contacts 35 and is connected to the cold side of contacts 19 ahead of relay 22. A lead 36 is connected from terminal 25 to lead 34 and contains a dropping resistor 37 and a power-on indicator light 38. One terminal 39 of a connector plug 40 is connected to the cold side of contacts 26 and includes normally open contacts 41. A second terminal 42 in plug 40 is connected directly to the cold side of contacts 27. In a manner similar to that previously described, a dropping resistor 43 and a power-on indicator light 44 are connected across the terminals of plug 40. Relay 21 is supplied an actuating signal through leads 45 and 46 which connect into the main control unit in a manner such as illustrated in FIG. 1. While the signal for actuating the first relay means 21 may be supplied in a variety of ways depending on the type of control circuit utilized in the main box, it has been found that the most satisfactory control unit is one which contains a transformer in series with the heating element associated with the main control box and that the adapter 13 should be connected through leads 45 and 46 ahead of the series transformer. Such a connection permits the main control to continue to monitor its associated heating element without any modification of the signal due to the presence of the adapter unit.

In operation, when the main control unit 1 actuates its switch means to supply power to its associated heating unit 3, a signal is likewise transmitted through leads 45 and 46 to actuate relay 21. The latter relay closes normally open contacts 19 and 20 thereby sending power from cable 14 to plug 24. When a circuit to a heating element connected to plug 24 is present, relay 22 actuates which closes contacts 35. When contacts 35 close, power is supplied to actuate second relay 32 and also to turn on indicator light 38 signifying that power is connected to the element associated with the paired relays 21 and 22. Upon actuation, relay 32 closes contacts 26 and 27, thereby sending power to outlet 30. At the same time relay 28 is actuated and contacts 41 closed if a heating element is connected to outlet 30. By means of connector plug 40 a second adapter unit may be connected to the one illustrated so that additional heating elements can be utilized in the system. It is clear, of course, that an adapter unit may contain any number of paired switches or relays in the manner illustrated and that any number of adapter units may be serially connected together to permit use of any number of heating elements. Such a system not only provides great flexibility in the size of tires which may be vulcanized but also leaves undisturbed the operation of the main control unit and its associated heating element. Furthermore, it permits the adaptation of a single control unit to control the electrical heating of a number of tire molds simultaneously.

While certain representative embodiments and details have been shown for the purpose of illustrating the invention, it will be apparent to those skilled in this art that various changes and modifications may be made therein without departing from the spirit or scope of the invention.

I claim:

1. In a control system for electrical heating elements used in a vulcanization system wherein a main electrical control unit switches electrical energy to an associated heating element in response to the power demand thereof, means for adapting said system to the use of a plurality of heating elements to vulcanize large tires without requiring substantial additional power handling capacity in said control unit comprising, in combination, a plurality of paired first and second relay means arranged so that the second relay means actuates upon operation of its paired first relay means, the first relay means of the initial paired relay means being connected to said control unit and operable upon the switching of electrical energy to said associated heating element by said control unit, said plurality of paired relay means being electrically coupled so that each succeeding first relay means is actuated upon operation of the preceding second relay means, said first relay means acting to connect an associated heating element of said plurality of elements to a source of power therefor.

2. In a control system for electrical heating elements used in a vulcanization system wherein a main electrical control unit switches electrical energy to an associated heating element in response to the power demand thereof, means for adapting said system to the use of a plurality of heating elements to vulcanize large tires without requiring substantial additional power handling capacity in said control unit comprising, in combination, a plurality of paired first and second switch means arranged so that the second switch means actuates upon operation of its paired first switch means, the first switch means of the initial paired switch means being connected to said control unit in parallel with said associated heating element and operable upon the switching of electrical energy to said associated heating element by said control unit, said plurality of paired switch means being electrically coupled so that each succeeding first switch means is actuated upon operation of the preceding second switch means, said first switch means acting to connect an associated heating element of said plurality of elements to a source of power therefor.

3. In a control system for electrical heating elements used in a vulcanization system wherein a main electrical control unit switches electrical energy to an associated heating element in response to the power demand thereof, means for adapting said system to the use of a plurality of heating elements to vulcanize large tires without requiring substantial additional power handling capacity in said control unit comprising, in combination, a plurality of paired first and second relay means arranged so that the second relay means actuates upon operation of its paired first relay means, the first relay means of the initial paired relay means being connected to said control unit in parallel with said associated heating element and operable upon the switching of electrical energy to said associated heating element by said control unit, said plurality of paired relay means being electrically coupled so that each succeeding first relay means is actuated upon operation of the preceding second relay means, said first relay means acting to connect an associated heating element of said plurality of elements to a source of power therefor.

4. In a control system for electrical heating elements used in a vulcanization system wherein a main electrical control unit switches electrical energy to an associated heating element in response to the power demand thereof, said control unit having means in series with said associated heating element to derive a signal representative of the current therethrough and hence the temperature thereof, means for adapting said system to the use of a plurality of heating elements to vulcanize large tires without requiring substantial additional power handling capacity in said control unit comprising, in combination, a plurality of paired first and second switch means arranged so that the second switch means actuates upon operation of its paired first switch means, the first switch means of the initial paired switch means being connected to said control unit in parallel with said associated heating element preceding said series means and operable upon the switching of electrical energy to said associated heating element by said control unit, said plurality of paired switch means being electrically coupled so that each succeeding first switch means is actuated upon operation of the preceding second switch means, said first switch means acting to connect an associated heating element of said plurality of elements to a source of power therefor.

5. In a control system for electrical heating elements used in a vulcanization system wherein a main electrical control unit switches electrical energy to an associated heating element in response to the power demand thereof, said control unit having means in series with said associated heating element to derive a signal representative of the current therethrough and hence the temperature thereof, means for adapting said system to the use of a plurality of heating elements to vulcanize large tires without requiring substantial additional power handling capacity in said control unit comprising, in combination, a plurality of paired first and second relay means arranged so that the second relay means actuates upon operation of its paired first relay means, the first relay means of the initial paired relay means being connected to said control unit in parallel with said associated heating element preceding said series means and operable upon the switching of electrical energy to said associated heating element by said control unit, said plurality of paired relay means being electrically coupled so that each succeeding first relay means is actuated upon operation of the preceding second relay means, said first relay means acting to connect an associated heating element of said plurality of elements to a source of power therefor.

References Cited in the file of this patent

UNITED STATES PATENTS

| | | |
|---|---|---|
| 1,364,212 | Sharpe | Jan. 4, 1921 |
| 1,511,050 | Collins et al. | Oct. 7, 1924 |
| 1,933,901 | Gannon | Nov. 7, 1933 |
| 2,509,693 | Morrison | May 30, 1950 |
| 2,625,661 | Haydon | Jan. 13, 1953 |
| 2,958,755 | Miller | Nov. 1, 1960 |

FOREIGN PATENTS

| | | |
|---|---|---|
| 651,733 | Great Britain | Apr. 11, 1951 |